(12) United States Patent
Brookhart

(10) Patent No.: US 9,030,502 B2
(45) Date of Patent: May 12, 2015

(54) SYSTEM AND METHOD FOR ORGANIZING DOCUMENTS

(75) Inventor: Chris Brookhart, Lehi, UT (US)

(73) Assignee: Ancestry.com Operations Inc., Provo, UT (US)

( * ) Notice: Subject to any disclaimer, the term of this patent is extended or adjusted under 35 U.S.C. 154(b) by 194 days.

(21) Appl. No.: 13/440,586

(22) Filed: Apr. 5, 2012

(65) Prior Publication Data
US 2013/0265334 A1 Oct. 10, 2013

(51) Int. Cl.
G09G 5/00 (2006.01)
G06F 3/0486 (2013.01)
G06F 3/0481 (2013.01)

(52) U.S. Cl.
CPC .......... *G06F 3/0486* (2013.01); *G06F 3/04812* (2013.01)

(58) Field of Classification Search
None
See application file for complete search history.

(56) References Cited

U.S. PATENT DOCUMENTS

| 8,036,417 | B2 | 10/2011 | Gallagher et al. | |
| 2007/0098303 | A1 | 5/2007 | Gallagher et al. | |
| 2011/0029564 | A1* | 2/2011 | Graham et al. | 707/782 |
| 2012/0054190 | A1* | 3/2012 | Peters | 707/741 |

FOREIGN PATENT DOCUMENTS

CN 101345721 B * 9/2011

OTHER PUBLICATIONS

Tong Zhang, Jun Xiao, Di Wen, and Xiaoqing Ding. 2009. Face based image navigation and search. In Proceedings of the 17th ACM international conference on Multimedia (MM '09).*
English translation for CN 101345721 B, acquired from Google Patent.*

* cited by examiner

*Primary Examiner* — Tize Ma
*Assistant Examiner* — Yu Chen
(74) *Attorney, Agent, or Firm* — Kilpatrick Townsend & Stockton LLP

(57) ABSTRACT

A system and method for organizing photos and other documents include a user interface for displaying photos and data nodes. A photo may be placed at a data node by selecting a facial image in the photo and then moving the facial image (e.g., using a drop and drag technique) to associate the facial image with the node. In alternative embodiments, a portion of a photo other than a facial image may be selected, or an entire photo may be selected, and then placed at the node. The user can identify nodes based on the person in the facial image and tag the photo with identifying information. In some embodiments, existing nodes (e.g., in a family tree) can be displayed in order to have photos placed therein. Relationship nodes can be suggested as facial images are associated with nodes.

17 Claims, 11 Drawing Sheets

SYSTEM AND METHOD FOR ORGANIZING DOCUMENTS

BACKGROUND OF THE INVENTION

With the widespread use of digital photography and digital storage, people are collecting large numbers of photos and copies of photos. In some instances, the photos may be hardcopy or hard print photos (stored in shoe boxes, photo albums and so forth) that were taken many years before, or may be soft, digitally stored copies of hard print photos that have been digitally scanned. In other instances, the photos may be more recently taken digital photos. While photos might be organized by either placing them in electronic folders or by tagging the photos (i.e., digitally labeling or identifying the photos with pertinent information, such as who is in the photo, where the photo was taken, and when it was taken), this can be very difficult because of the large number of photos that most people collect, the amount of time that it takes to individually view and classify or identify each photo, and in some cases, because of the age of the photo or other factors that make it difficult to accurately identify the photo.

For many family photos, there may be the desire to store a photo so that it can be seen as part of a family tree. A family tree is often structured as a plurality of interconnected data nodes (e.g., a node is associated with each person in the family tree and has data records for its associated person). Storing photos at nodes so they can be associated with family members can be difficult and cumbersome, especially if there a large number of family photos to be organized.

BRIEF SUMMARY OF THE INVENTION

There is provided, in accordance with embodiments of the present invention, a system and method for organizing documents by associating a document with a data structure having one or more data nodes.

In one embodiment, a method for associating a document with a data structure comprises displaying the document at a graphical user interface, selecting at least a portion of the document, creating a data node, and displaying the data node at the graphical user interface. The selected portion of the document is then graphically moved at the graphical user interface to the displayed data node (e.g., using a "drop and drag" technique). In response to graphically moving the selected portion to the displayed data node, the method associates the document with the data node. The method further comprises receiving (e.g., from a user) node identifying information, for identifying the displayed data node, and receiving tagging information for the displayed document, for identifying the displayed document.

A more complete understanding of the present invention may be derived by referring to the detailed description of the invention and to the claims, when considered in connection with the Figures.

DETAILED DESCRIPTION OF THE INVENTION

Figure 1:
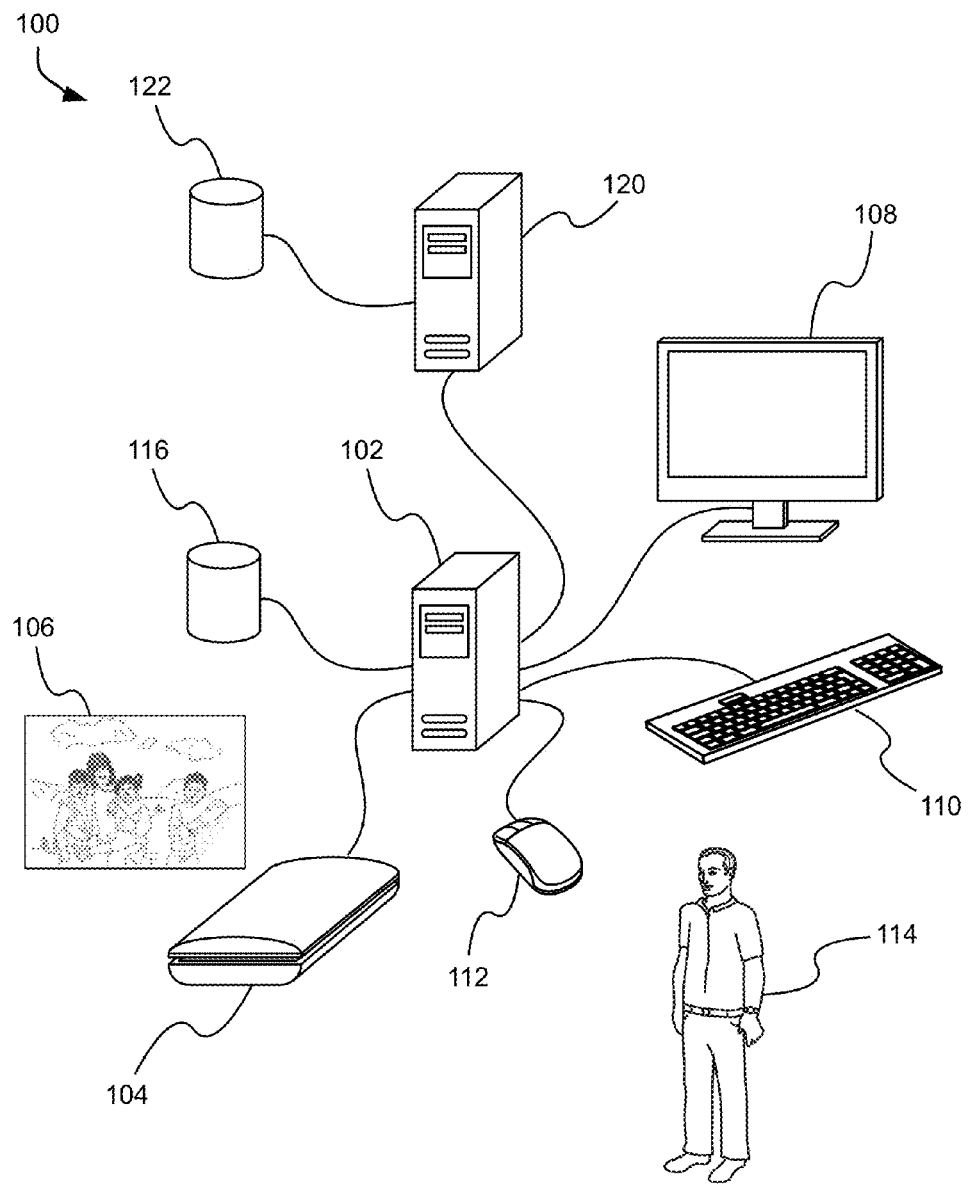
FIG. 1 is a general block diagram of a system in accordance with an embodiment of the invention.

There are various embodiments and configurations for implementing the present invention. Generally, embodiments provide systems and methods for organizing documents, such as photos, at data nodes.

In some embodiments, documents (such as photos) are displayed one at a time to a user at a display device. Data in the form of a facial image is selected on a displayed photo, and a data node is created and also displayed on the display device. For example a single screen may be split or separated so that one portion of the screen shows the photo and another portion of the screen shows the data node.

The data node in one embodiment may be empty, at least initially. The displayed photo (or a portion thereof) may be copied and placed at (associated with) the data node by graphically moving the selected facial image to the node. The processes of graphically moving the facial image to a node can be done with a known "drag and drop" process. For example, using a mouse, a cursor or pointer can be placed over the facial image. The mouse is clicked to select and hold the image, and it is dragged to the node by moving the mouse to the node, where the mouse then releases the facial image in order drop or place the photo at the node. However, other means for moving the facial image to the node can be employed, such as a drop down menu with mouse or keystroke selections (e.g., for selecting where the photo is being moved from and to), or a touch screen with a user's fingertip moving across as it is in contact with the screen. When a data node is initially empty, the user may be prompted to identify or name the node at which the photo has been placed (e.g., using the name of the person whose facial image has been selected and moved to the node). In addition to identifying the node, the user may also be prompted to enter tagging information concerning the photo (such as date, place, event, location and so forth).

As individual photos are displayed, and facial images are selected, the user may place photos in either newly created empty nodes or in previously created and identified nodes (already having photos relating to the same person). Accordingly, in one embodiment, if a node is identified with a person's name and represents a location for storing photos for that person, displayed photos can be organized for that person by placing them at the same node. Of course, a photo may contain more than one facial image, and the same photo may be placed in several different nodes (by moving each facial image in the photo to a node corresponding to the person in the image). As a result, sequentially displayed photos may be conveniently and easily organized by placing a copy (or a link to a copy of the photo) in each pertinent node, and also conveniently tagged with information concerning the photo at the time the photo is placed at a node.

It should be appreciated that, in its broader aspects, the invention is not limited to photos. For example any document containing selectable information (such as text with words pertaining to one or more subjects in the document) may be selected and used to move copies of the document into one or more nodes relating to those subjects, using (as an example) the drag and drop process mentioned above.

In some cases, existing (previously created) nodes could be displayed with a photo on the screen, such as nodes in family tree (i.e., a plurality of interconnected nodes that each represent a person in the family, with the interconnections representing a relationship between the nodes/persons).

In one embodiment, as will be described more fully later, relationship nodes may be created after a photo has been placed at a node. For example, family photos often include several family members. A system according to this embodiment might automatically create, display and connect to the original node, several suggested family member nodes (e.g., spouse, sibling, child, parent, etc.), thus enabling the user to drop other facial images from the same photo into one or more of those relationship nodes, if applicable. In effect, these interconnected relationship nodes can then form the basis of an initial family tree, and as subsequent family photos are displayed, the facial images for family members in those photos can be placed in the corresponding nodes, thus organizing the photos in the interconnected nodes or tree (i.e., each node having photos with pictures or images of the person represented at the node). Thus, in a broad sense, embodiments of the invention herein can be used to "sense" how a data structure should grow with multiple interconnected nodes, by suggesting nodes to be added (and connected) to nodes in which photos have already been placed.

In another embodiment, the relationship nodes can be directed to relationships other than family relationships. A user might be prompted to select a different type of relationship. For example, the relationship nodes might all pertain to the same person at different stages of their life. Thus, based on the user's selection, the system in this embodiment might create and interconnect suggested nodes that each represent a different life stage, such as early childhood, early school years, high school, college, marriage, career and so forth, and as individual photos are displayed, the user can place the photos in one or more of those life stage nodes. Other forms of relationship nodes could also be suggested by the system and selected by the user, such as nodes based on birthdays (e.g., a separate node for each birthday of a child), friends, co-workers and many other possible categories. As should be appreciated, in some cases the nodes may be interconnected to represent a relationship between nodes and an overall data structure (such as a family tree data structure), but in other cases the nodes created (either as relationship nodes or as new nodes when a photo is first displayed) could remain unconnected and merely reflect different categories for a photo to be conveniently classified and stored in.

In some embodiments, nodes (whether relationship nodes or unconnected nodes) can be used in conjunction with the recognized subject of a photo to suggest nodes that might be added to a data structure. As an example, suppose a family photo shows a bride and groom, with the bride in a wedding dress and the groom in a military uniform. A system in accordance with one aspect of the present invention could recognize (based on programmed features, predictive or probabilistic rules engines, or intelligent or neural networks) the wedding dress or military uniform in the photo, and then suggest nodes based on the recognition. Thus, as photos are displayed on a user interface or screen, the system might apply predictive or other analysis to recognize objects or features in the photo, and then present suggested nodes (perhaps in addition to previous nodes already created) with a specified category (e.g., a "wedding" node or a "military" node) into which one or more facial images on the picture might be associated (and into which a copy of the photo placed).

Other aspects or characteristics of displayed photos might also be used to suggest possible nodes. For example, an estimated age or date of the photo could be used to suggest a node. As one example only, if relationship nodes have been suggested for different stages of life, recognizing the date of the photo or the age of the person in a facial image could suggest additional nodes for a data structure representing different stages of a person's life (e.g., specific years during a person's life or specific birthdays).

As mentioned earlier, existing nodes (such as from a family tree) could be displayed along with a photo. In such case, a user could drag and drop a facial image (and a copy of the photo) into the appropriate node based on the recognition of a person (facial image) by the user, or in some instances, based on the system recognizing a facial image as being that of a person represented at one of the nodes.

Turning now to FIG. 1, there is illustrated a simplified schematic of a system 100 that may be used to perform the methods and operations described herein. Briefly, and as examples only, the system may be used to scan hard print photos (or receive photos in digital form), detect facial images in the photos, create nodes into which the photos may be placed (e.g., dragged and dropped) in order to organize the photos, and also tag the photos with identifying information. The system may also be used to provide access to, manage and store data (including photos) as part of a data structure of interconnected nodes, such as a family tree. The system may also be used to share photos (and associated data) among users of the system, in ways that will be illustrated and described in greater detail later.

The system may include a computing system 102. The computing system 102 may be any type of computer operated by an individual, such as a personal home computer or laptop, or may be a component of a larger computing system, such as a server operated by a corporation or company. In one embodiment, the computing system 102 may include a communications interface, a processor, and/or a memory device (as will be described later in conjunction with FIG. 11) to perform the operations and methods described herein. For example, the computing system 102 may display a visual user interface or screen (as will be described later in conjunction with FIGS. 3-5 and 7-10) that enables a user to move a displayed photo to a data node.

The computing system 102 may be communicatively coupled via a network to a remote computing system 120 (e.g., a computer or server). Similarly, computing system 120 may be communicatively coupled with a database 122 that stores searchable data and documents so that other computing systems, such as computing system 102, may perform searches over a network. For example, computing system 120 may be operated by a company (such as Ancestry.com, Provo, Utah) that stores and provides access to searchable documents and data. The company may provide the searchable data to the public over a network so that individuals may search the company's database for various information. In one embodiment, the searchable documents and/or database comprises genealogical or ancestral records, family photos and other family records and data that may be stored in (and retrieved from) database 122 in the form of family trees, each tree having interconnected data nodes, and each node representing one person in the family tree. The family tree and/or other data could be provided to computing system 102 through an accessible website. In alternative embodiments, the searchable documents and/or database comprises information and data structures that may be non-genealogical (as examples only, general photos, emails, company records, articles and other text and non-text documents), available for access over a public or private network.

The computing system 102 may be communicatively coupled with various hardware. For example, FIG. 1 illustrates the computing system 102 communicatively coupled (directly or through a network) with a memory or data storage device 116, a display device 108, a keyboard 110, a mouse 112, and a document input device that in one embodiment is a scanner 104, but which alternatively may be photocopier, camera, and/or any other device capable of providing a document to a computing system. Among other things, the scanner 104 may be used to scan photographs, such as an illustrated photograph 106. The memory device 116 may be a remote database or may be internal to the computing system 102. The memory device 116 may store information and/or instructions (such as computer software) for performing the methods described herein. The information and computer software may be downloaded, at least in part, from remote systems, such as remote computing system 120. In one embodiment, photographs scanned at scanner 104 may be transmitted to remote system 120 for storage and processing, and then, upon request of the user 114, provided to computing system 102 for display to the user (along with other data) at display device 108. As will be illustrated and described shortly, photos and other data may be provided to the computing system 102 and, according to some aspects of the present invention, have portions thereof (such as facial images) selected and highlighted in various ways to provide associations between photos and other data, allowing the user to graphically move or place (associate) a photo with a data node of a data structure maintained at database 122, such as through the use of mouse 112.

The display device 108 may be any type of device for displaying visual information to a user 114, such as a LCD display, plasma display, CRT display, etc., and may include functionality for providing a touch screen. The display device can provide a graphical user interface (GUI) to a user 114 so that the user can, among other things, select and move facial images (e.g., from a displayed photo to a data node). Keyboard 110 and/or mouse 112 can also allow the user 114 to provide input to the computing system 102 and/or computing system 120. The input information may include a selection of photos, facial images in photos and other data to make associations (e.g., between a photo and a data node). The keyboard 110 and/or mouse 112 may also allow the user 114 to make selections and to key in (i.e., type) information relating to photos and other documents.

As mentioned above, family tree structures may be created and managed at remote system 120 and stored at database 122, and accessed by and (in some embodiments) also created at system 102 and stored at local memory device 116. Family tree structures and information associated therewith will be illustrated and described later, but briefly, the family tree information may include various data records for each person represented in the family tree, including basic information (such as name, birthdate, birth place, date of death and similar information taken from historical records and vital statistics), various documents and records (including photos) that have been digitally scanned and stored in association with each person, and the relationships between people and between nodes. The structure of a family tree and its data nodes (which each may be thought of as representing a folder or file of stored data or records that are accessed by accessing the node), and the manner in which various records (including images and photos) can be stored in association with each person or node in a family tree, are known and are described, for example, in commonly owned U.S. patent application Ser. No. 13/049,671, filed Mar. 16, 2011, by Donald B. Curtis, for METHODS AND SYSTEMS FOR IDENTIFICATION AND TRANSCRIPTION OF INDIVIDUAL ANCESTRAL RECORDS AND FAMILY, U.S. patent application Ser. No. 13/035,816, filed Feb. 25, 2011, by Matt Rasmussen, et al., for METHODS AND SYSTEMS FOR IMPLEMENTING ANCESTRAL RELATIONSHIP GRAPHICAL INTERFACE, and U.S. patent application Ser. No. 12/511,009, filed Jul. 28, 2009, by David Graham et al., for SYSTEMS AND METHODS FOR THE ORGANIZED DISTRIBUTION OF RELATED DATA, each of which is hereby incorporated by reference.

Figure 2:
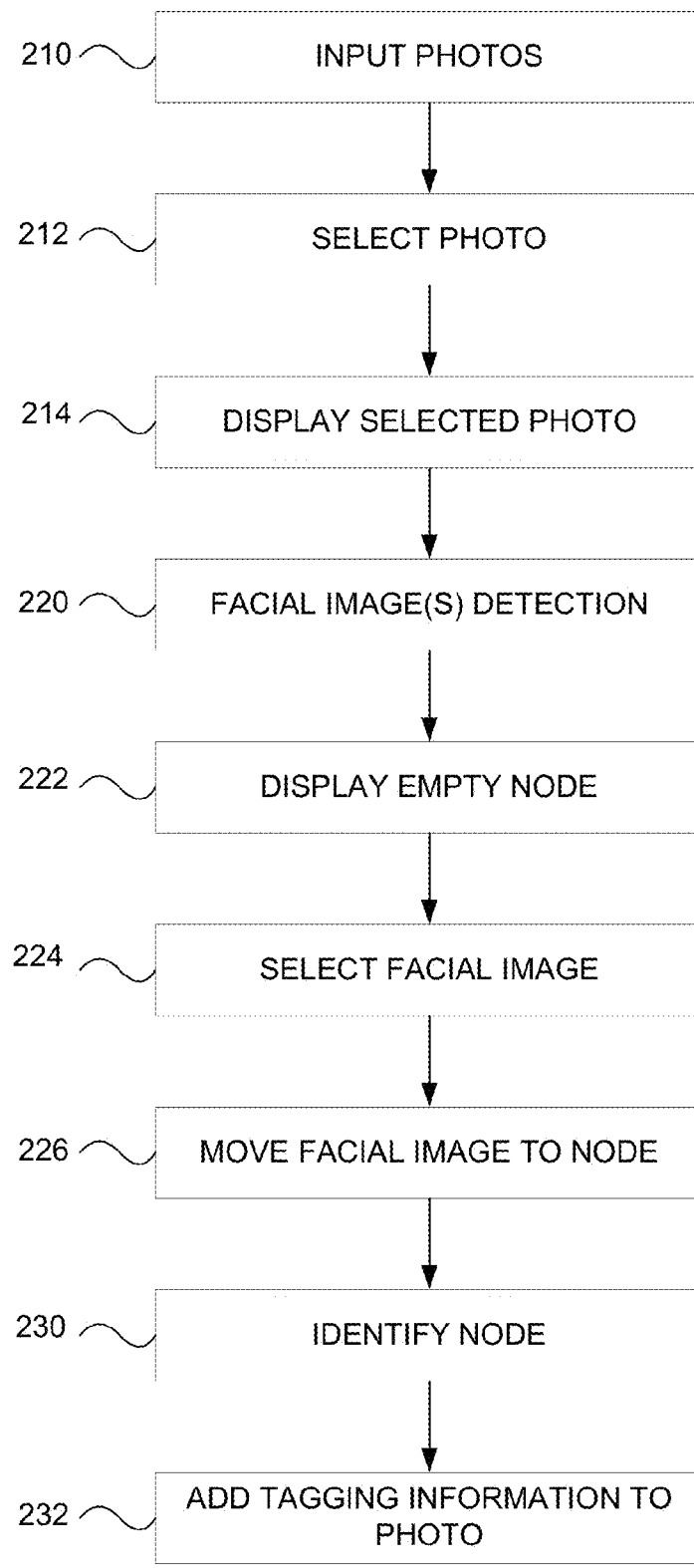
FIG. 2 is a flow diagram illustrating a process for organizing and identifying photos in accordance with an embodiment of the invention.

FIG. 2 is a simplified flow diagram illustrating a process in accordance with one embodiment of the invention, wherein photos are organized by, among other things, associating each photo with (and storing the photo at) a data node.

In the embodiment illustrated in FIG. 2, it is anticipated that the user of the system 102 might have a stack of hardcopy print photos which are not organized and for which identifying information is missing or incomplete. The photos are scanned to input digital copies at step 210, using scanner 104. The scanned images from the scanner are stored in memory 116 or stored remotely at database 122. As mentioned earlier, in some instances digital images may be available (rather than print copies of photos needing to be scanned), and could be inputted to the system 102 at step 210 from a storage medium such as a compact disc, from a digital camera, or from other sources, such as a server storing photos at an online photo album website.

Figure 3:
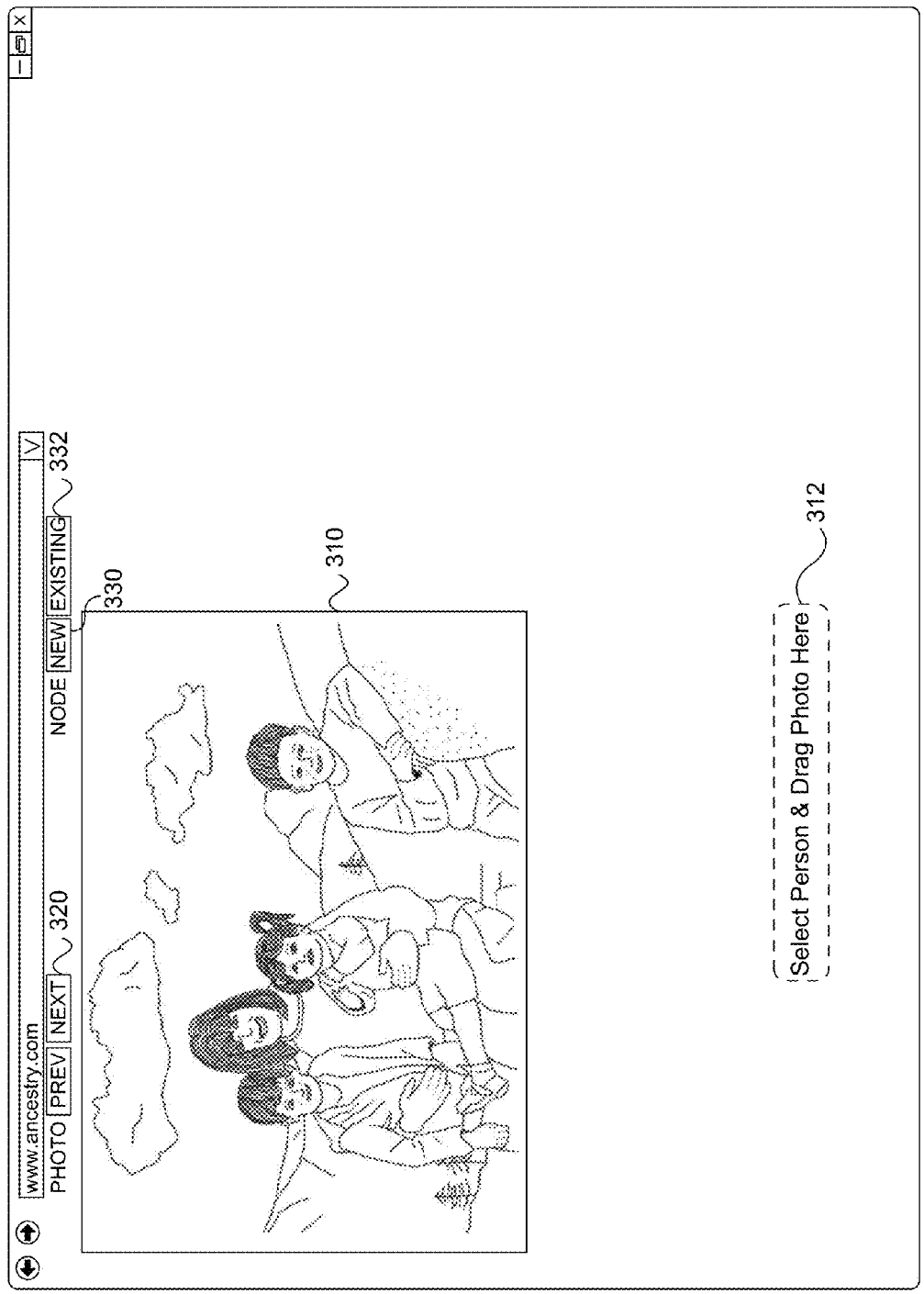
FIG. 3 through 5 each illustrates a display on a user interface, used in implementing the process of FIG. 2.

One of the inputted photos is selected (step 212) and then displayed to the user (step 214). A user interface or screen for displaying a photo is seen in FIG. 3. The selection and display of photos could be done automatically by the system 102, with each photo (in a set or series of photos that have been scanned or inputted) sequentially selected for display after a user has placed the preceding photo at a data node, such as the node 312 seen in FIG. 3. In other embodiments, the user may (after accessing the file containing pictures to be organized), manually select photos (for example, from a collage or collection of thumbnail photos displayed on the user interface). Alternatively, after a photo has been displayed and acted on by the user, the user may select the next photo in the file to be displayed with the use of a graphical button, such as the button 320 seen in FIG. 3.

Figure 4:
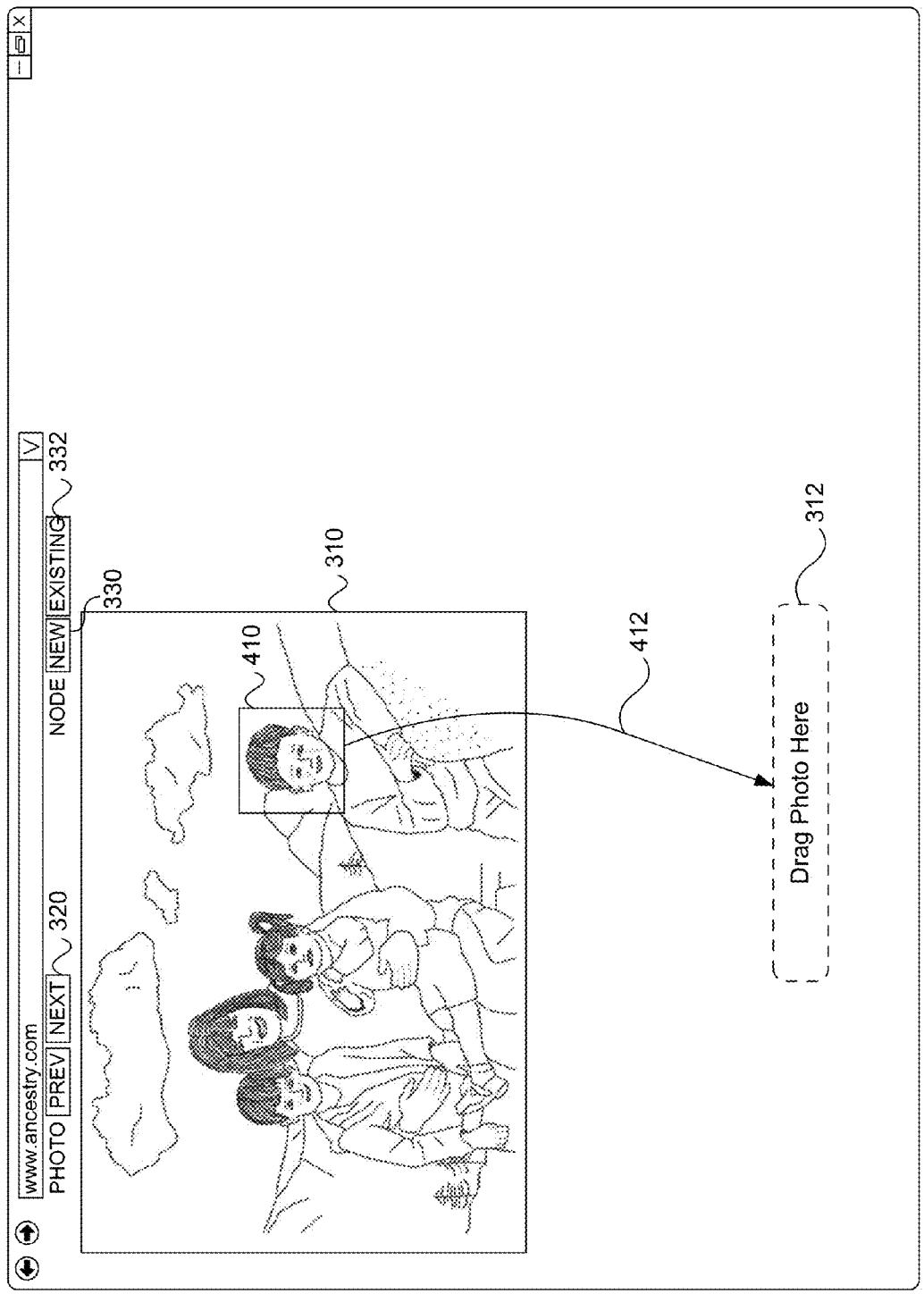

Each photo is subject to facial image detection at step 220. At such step, the system 102 (or remote systems, such as system 120) processes the digital data representing the images in the photo to detect each face. Systems for processing photographs and detecting facial images are known, such as described in U.S. Patent Application Publication No. 2007/0098303 of Andrew Gallagher et al. and various publications and references discussed therein. At step 222, a node is displayed (node 312 in FIG. 3). The node 312 represents a file or folder that at least initially may be empty, and into which copies of one or more photos (or links to photos that are stored elsewhere) may be placed using a "drag and drop" technique. The user selects a facial image on the photograph (step 224), such as by moving a cursor or pointer over one of the images. This is illustrated in FIG. 4, where a graphical outline or box 410 appears around a facial image in photo 310 (such as when the user places a cursor over that image with the use of mouse 112). At step 226, the user drags the facial image 410 to the node 312, as represented by arrow 412 (FIG. 4), and then releases the facial image 410 at the node 312 (causing a copy of the photo to be placed at the node). In alternative embodiments, the user may select a portion of a photo and only that selected portion of the photo is placed at the node. In yet other embodiments, the entire photo may be placed at the node, but the selected facial image remains identified or highlighted so that when accessed at the data node, the selected facial image will be evident. In still other embodiments, the entire photo may be selected (rather than just single facial image), and the entire photo is dragged to the node and dropped in place.

Figure 5:
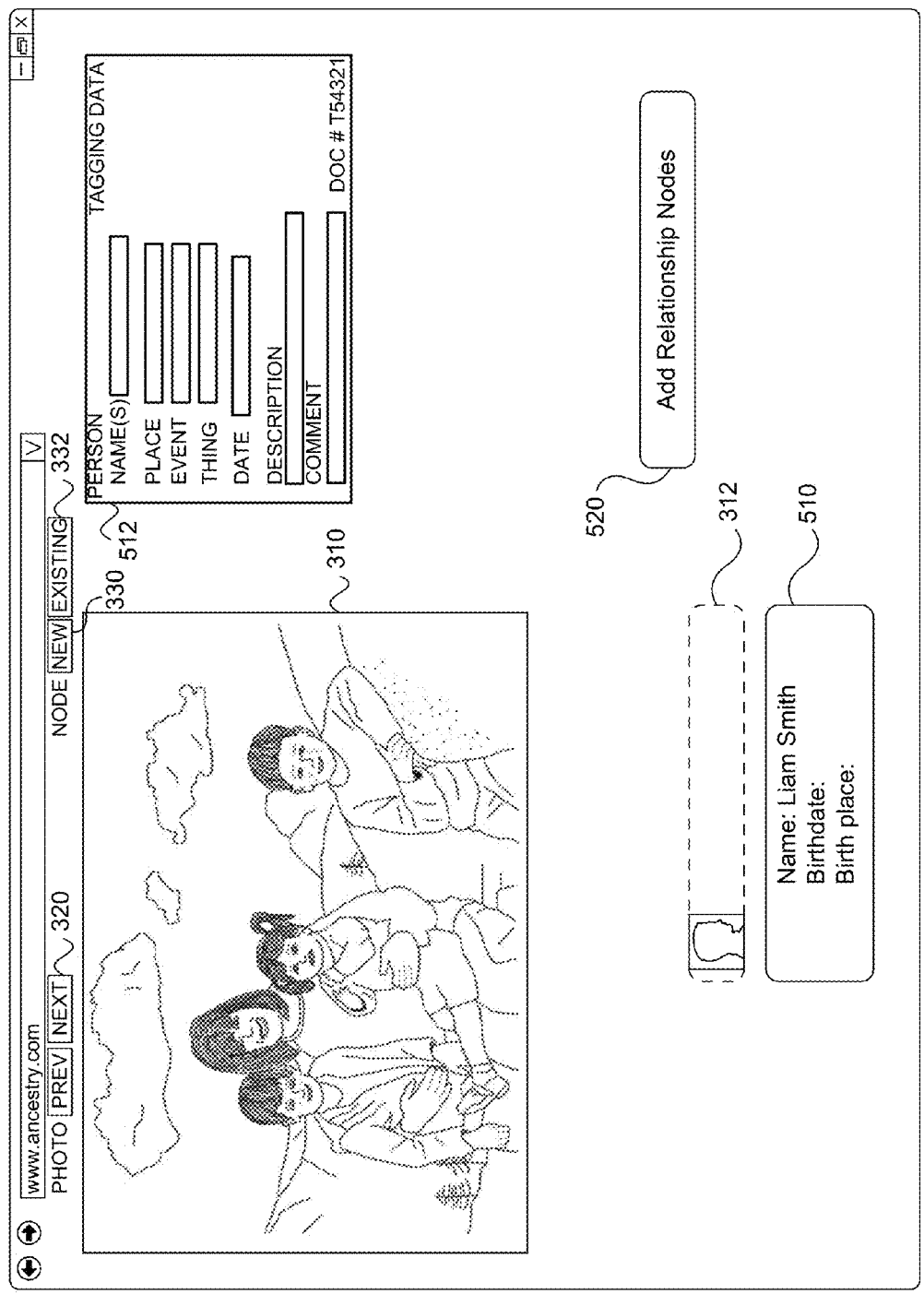

At step 230, the user then identifies the node 312 (e.g., if it were empty and not yet named when the photo is placed at the node), such as with the use of a data entry window or box 510 (FIG. 5) that appears next to the node after a photo has been placed at the node. As illustrated in FIG. 5, if the user is building a data structure such as a family tree, the data entry box would ask for the name of the person whose facial image has been dragged to the node 312 (that name would typically be the name or ID of a node in a family tree). As illustrated, other information (birthdate and birth place) might also be used to identify the node.

Finally, at step 232, the user may enter tagging information for the photo that has been placed at the node. A tagging data entry window or box 512 that might appear on the user interface display is shown in FIG. 5. As should be appreciated, in the illustrated embodiment the tagging information entered is used to identify the photo 310 (rather than node 312), and the tagging information would accompany the photo at the node 312 (as well as any other node at which the photo may be subsequently placed—e.g., if there is more than one facial image and thus more than one node for the photo). The tagging information can be thought of as metadata that is associated and stored with the photo (wherever the photo itself might be stored in the system). The tagging information could include, as illustrated, information on a person, place, event, or thing (e.g., location, surroundings, etc.), and a text description or comment concerning the photo. These fields are exemplary, and many other possible fields (not illustrated) could be presented for requesting tagging data, such as a date and other information that might be pertinent to the photo.

It should be appreciated that both the node identifying information (box 510) and the photo tagging information (box 512) permits more versatile access to a photo, by either (1) accessing a node (e.g., using a name or category that has been entered at box 510 and that a user wanting to retrieve a photo might know or anticipate), or (2) searching the database of photos (and its metadata or tagging information) using key terms or search terms that have previously been entered at box 512.

Figure 6:
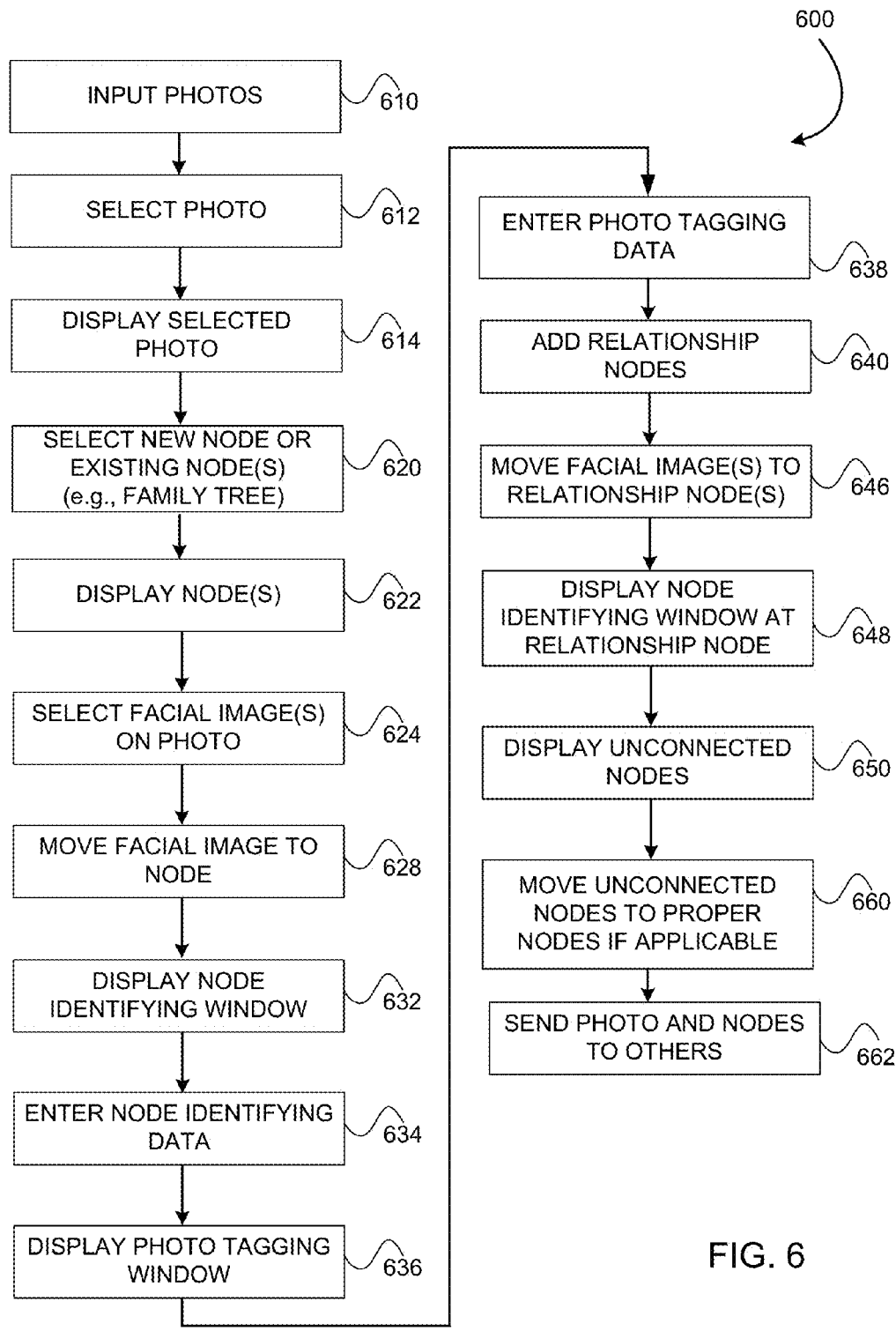
FIG. 6 is a flow diagram illustrating a process for organizing and identifying photos in accordance with another embodiment of the invention.

Turning now to FIG. 6, there is illustrated a more detailed process for organizing photos in accordance with another embodiment of the invention. As with the process in FIG. 2, photos are inputted, one of the photos is selected, and the selected photo is displayed at a user interface on the display device 108 (steps 610, 612, and 614). At step 620 the user will select either a new (empty node) or one or more existing nodes. This could be accomplished by a selection made at buttons 330 and 332 (see, e.g., FIG. 3). For example, if the user has just begun the photo organizing process and has, in viewing the photo 310, determined that a new node will need to be created for one of the facial images (e.g., the facial image is of a person for whom the user believes a node has not been previously established), the button 330 can be selected to create the node 312. Alternatively, if the user would like to place the photo in an existing node or existing data structure (such as an existing family tree), the button 332 may be selected. If button 332 is selected, a drop down menu or box (not shown) may appear which gives the user a list of existing nodes or data structures that can be selected for display at the user interface.

Returning the FIG. 6, at step 622 the new or existing nodes are then displayed on the screen (with the photo), and one or more facial images in the photo are selected by the user, step 624. The user moves and drops the selected facial image(s) to the appropriate node (step 628), which causes a copy of the photo to be stored at the node. As described in conjunction with FIG. 2, if the node were empty, the user will be prompted by a node identifying window (box 510, FIG. 5) at step 632 to enter node identifying information at step 634. Also, a photo tagging window (box 512) will be displayed at step 636 for the user to enter photo tagging data, step 638.

At step 640, the system adds relationship nodes, if appropriate. In one embodiment, this can be accomplished by a user clicking button 520 in FIG. 5 ("Add Relationship Nodes" button). In response to such selection, a drop down menu (not shown) can provide suggestions for relationship nodes that could be added, such as family, friends, special occasions (birthdays, career, stages of life, etc.). In other embodiments, the relationship nodes might be automatically displayed by default, such as the family nodes seen in FIG. 7 ("Add Child" node 710, "Add Spouse" node 712, "Add Sibling" node 714, and "Add Parent" node 716). In other embodiments, relationship nodes and their selection may be hidden at a node, but displayed when a user hovers over the node (using a pointer/cursor of the mouse 112). In these and other possible embodiments, if the user has established that he or she is organizing family photos, the system in effect senses the need for additional nodes when a facial image had been dropped into a node) and could automatically add (or prompt a user to add) family nodes whenever there are multiple facial images in the photo 312.

At step 646, the additional facial images can be dropped at each of the appropriate relationship nodes (causing the photo 310 to be placed at each such node). For example, in the photo 310, there are seen an adult and three children. The facial image of one child has been dropped at the original node 312. The facial image of the adult could be dropped at the Add Parent node 716 (if appropriate), and so forth. At step 648, each time a photo is placed at an empty node (by dropping a selected facial image at that node), a node identifying window (such as the window 510 seen in FIG. 5) appears adjacent the node in order to enter identifying information for the node.

Figure 7:
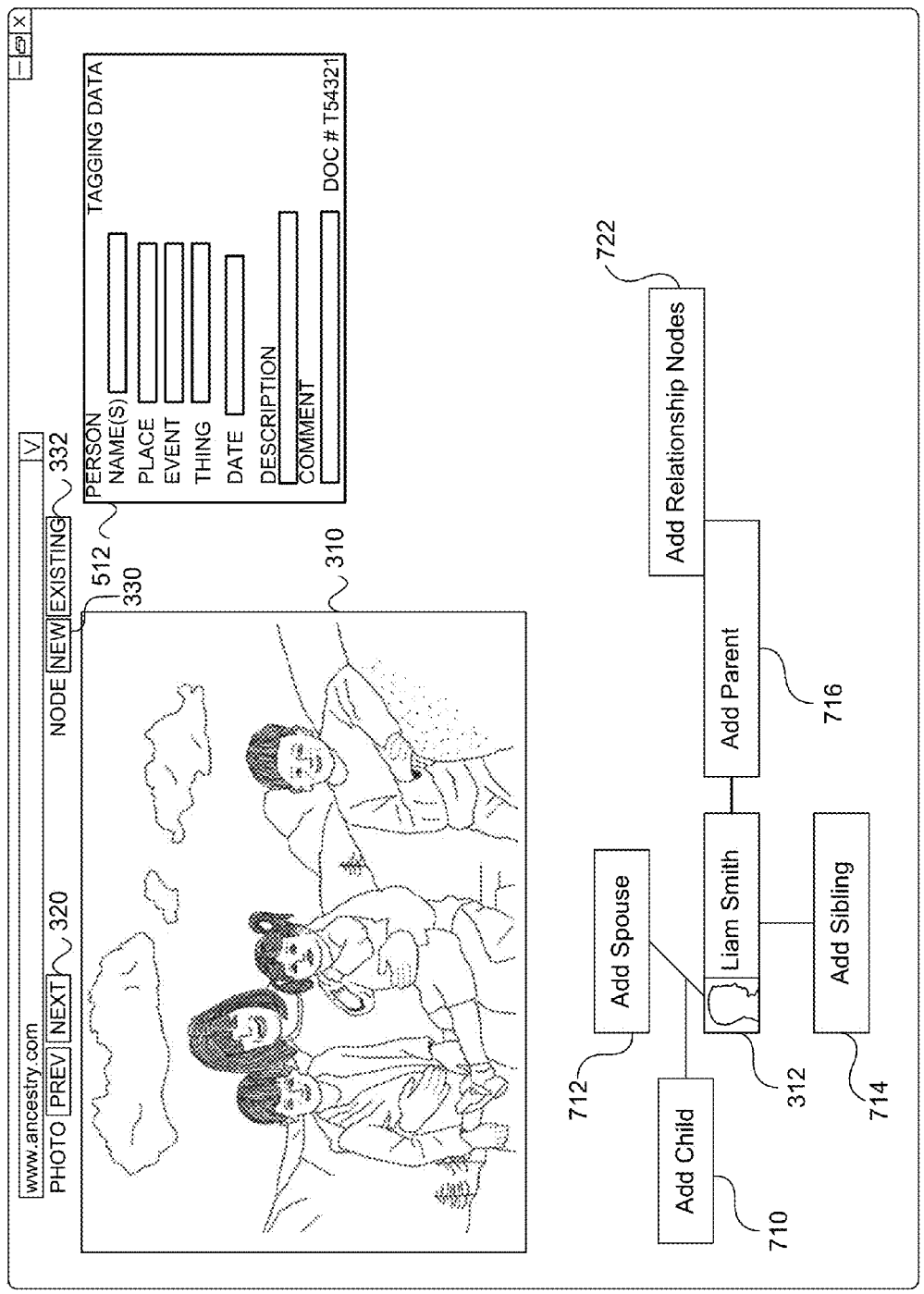
FIGS. 7 through 10 each illustrate a display on a user interface, used in implementing various embodiments of the invention.

It should be appreciated that the step of adding relationship nodes (step 640) can be performed for each node displayed, including one of the relationship nodes that has been added to the original node, such as those seen in FIG. 7. For example, an "Add Relationship Nodes" button 722 can appear next to each relationship node, and can be selected to add additional family relationship nodes to any one of the relationship nodes 710-716. This is illustrated in FIG. 8 where, after selecting the Add Relationship Nodes button 722 (FIG. 7), additional nodes (812-816) appear in relation to node 716.

Figure 8:
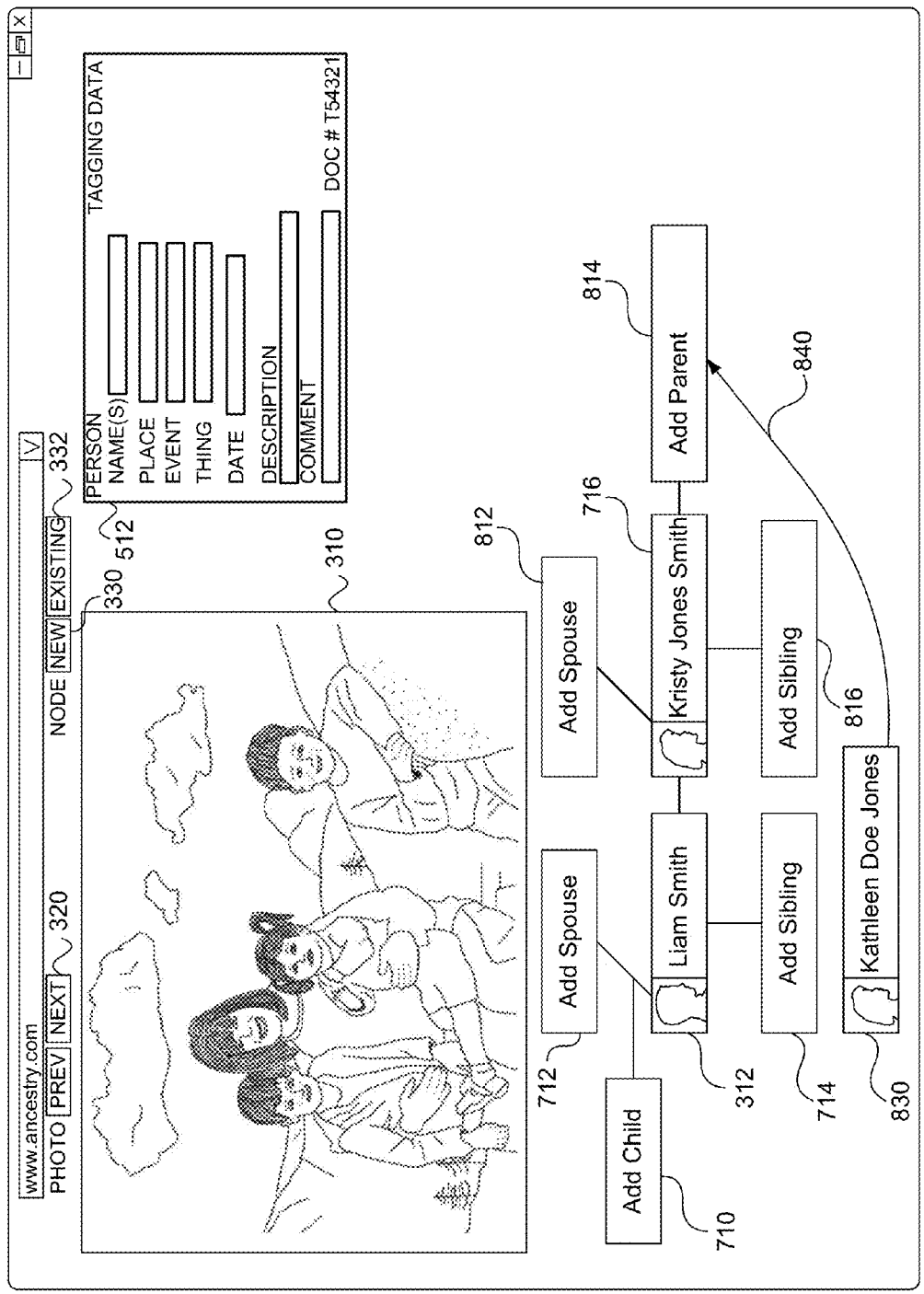

As can be seen in FIG. 8, a family tree has been built around the original photo 312, and as additional photos are added, those photos can be added to the various relationship nodes that are illustrated in FIG. 8.

Also seen in FIG. 8 is a separate node 830, which represents an existing node that has been previously created and at which a photo has been previously placed. For example, as photos are displayed, the user could view the just created nodes (such as nodes 312, 712-716 and 812-816), and then request the display of a node previously created (such as by selecting button 322). As noted earlier, the user may be provided a drop down menu to select from a list of existing nodes, and the separate (unconnected) and existing node 830 appears on the display as a result of such a selection and as seen in FIG. 8 (this is represented by step 650 in FIG. 6). In the exemplary screen in FIG. 8, the node 830 is recognized by the user as representing the same person as would be represented at the Add Parent node 814 (i.e., "Kathleen Doe Jones" is a parent of "Kristy Jones Smith"), and the user can drag and drop node 830 at node 814 (as represented by arrow 840) in order to combine those nodes (step 660). As a result, in FIG. 8 all photos (and other records) stored at node 830 are now stored at node 814, and node 814 (with its relationships with other nodes intact) becomes the surviving node. In this particular case in FIG. 8, node 814 is a parent node (to node 716), and all the photos and node identifying data stored in connection with node 830 are now stored in association with node 814.

In general, and as should be appreciated, the ability to combine nodes provides a means for a user to organize nodes when, for example, separate nodes have been created (resulting from different displayed photos), and then it becomes apparent to the user that an existing node is the same as another node that has been created and displayed. Thus, nodes (and their underlying data) can be combined, thereby removing duplicate nodes for the same person.

Figure 9:
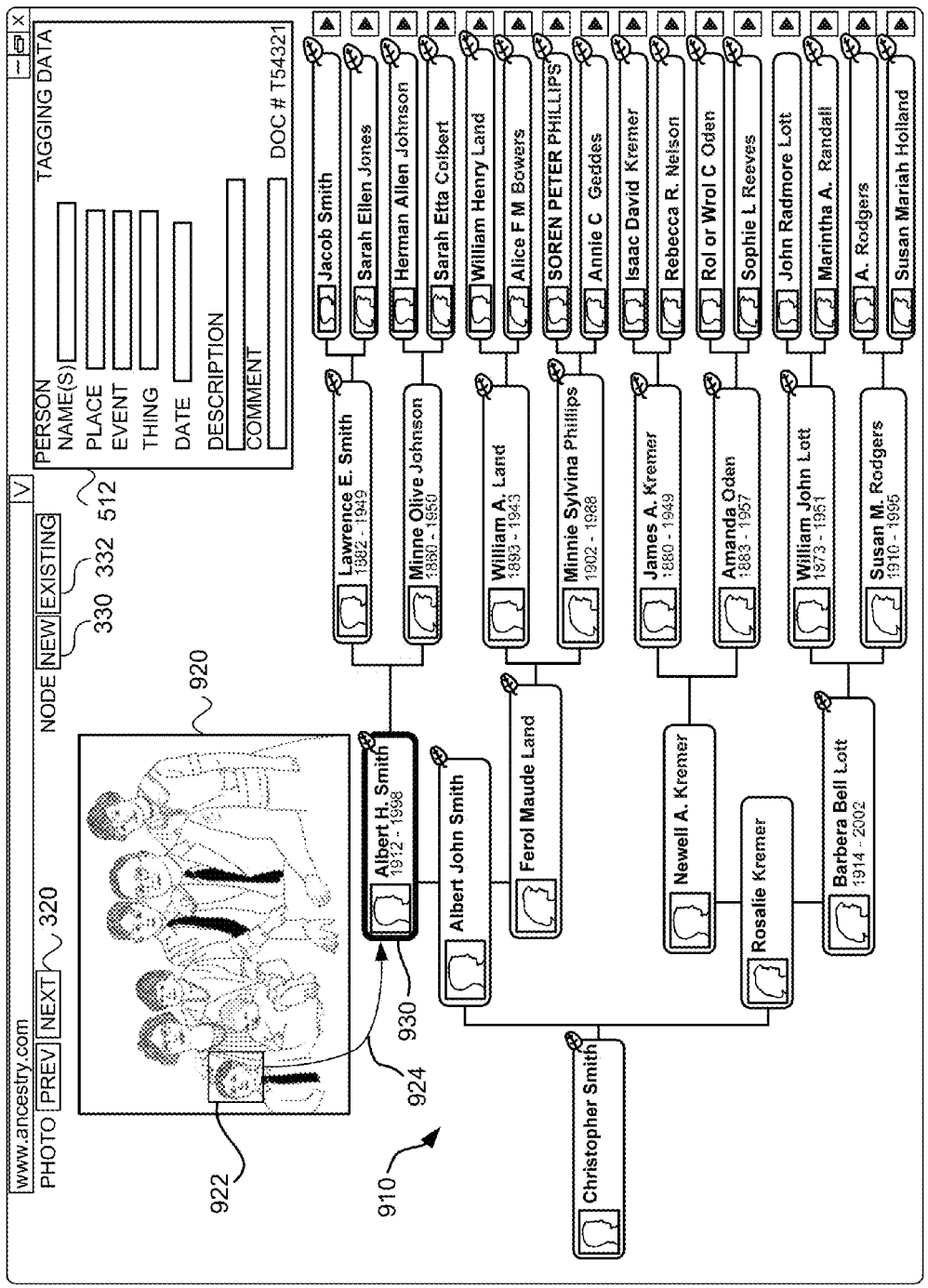

FIG. 9 shows a screen display similar to that of FIG. 8, but rather than a data structure or family tree that has been created from the sequential display of photos (such as might have given rise to the screen seen in FIG. 8), an existing family tree 910 has been selected (such as through use of button 322) and displayed at the same time as a photo 920 in the screen display of FIG. 9.

In one embodiment, facial images in the photo 920 are detected (as described earlier in conjunction with FIGS. 2 and 6), with one facial image selected by the user (such as by placing a cursor over the image) as indicated by the outline 922. That facial image can be dragged and dropped (as indicated by arrow 924) in order to place the photo at a node (highlighted or outlined at a box 930), based on the user recognizing the facial image as being the person represented at the outlined node.

In alternative embodiments, other techniques may be used for associating a facial image in photo 920 with one of the nodes in family tree 910. For example, facial recognition could be used as described in commonly owned U.S. patent application Ser. No. 13/440,811, filed on even date herewith, by Christopher Brookhart, for SYSTEMS AND METHODS FOR ASSOCIATING A PHOTO WITH A DATA STRUCTURE NODE, which is hereby incorporated by reference. Briefly, in such embodiment, each facial image in the photo 920 is detected, and then compared to photos already stored in association with the various nodes in the family tree 910. If a facial image in photo 920 is recognized as the same as one in a photo already stored, that facial image is selected (such as indicated by outline 922). The corresponding node in the family tree 910 is likewise outlined or highlighted as indicated by outline box 930. The user can then drag the facial image outlined at 922 and drop it at the node outlined by box 930.

Other techniques for associating or assisting a user in associating facial images with nodes are possible. For example, the age (or date) of photo 920 can be estimated or determined, using techniques described in commonly owned U.S. patent application Ser. No. 13/440,754, filed on even date herewith, by Christopher Brookhart and Jack Reese, for SYSTEMS AND METHODS FOR ESTIMATING/DETERMINING THE AGE OF A PHOTO, which is hereby incorporated by reference. In this embodiment, once the age of a photo had been estimated or determined, all the nodes that correspond to the age of the photo (people alive at the time of the estimated date of the photo) could be outlined or highlighted (there could be any number of nodes outlined, and the user would pick, if possible, the node that appears to be the one most likely representing the person in each facial image).

In yet other embodiments, the age of the people in the photo could be estimated and used (e.g., in conjunction with the age of the photo) to identify nodes that might correspond to the people in the photo. For example, and as described in aforementioned U.S. patent application Ser. No. 13/440,811, for SYSTEMS AND METHODS FOR ASSOCIATING A PHOTO WITH A DATA STRUCTURE NODE, knowing the ages (or estimated ages) of the people in the photo, those generations that would most likely be the people appearing the photo could all be outlined (e.g. people whose ages on the estimated date of the photo match the estimated ages). This may facilitate the user deciding which facial images to associate with people (nodes) in the family tree. The user could then drag and drop the facial images at such nodes, as appropriate.

Figure 10:
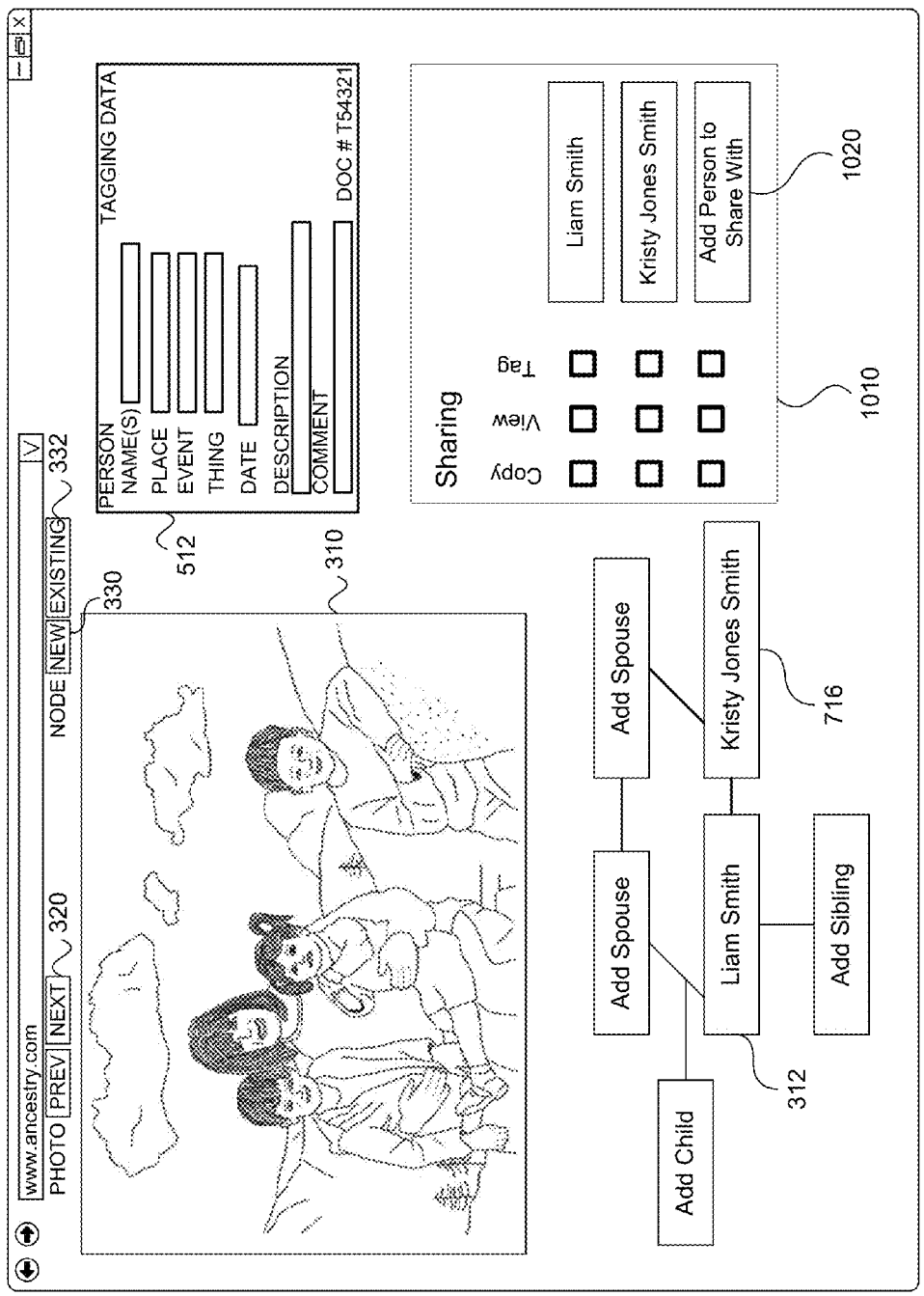

FIG. 10 illustrates an embodiment similar to that seen in FIGS. 7 and 8, and includes a sharing data entry window 1010. The window 1010 can be used to facilitate the sharing of photos with other people, such as those that may appear in the photo (this is represented by step 662 in FIG. 6). For example, in FIG. 10 nodes 312 and 716 have had photos placed therein. The two people at those nodes ("Liam Smith" and "Kristy Jones Smith") can be automatically selected (or, alternatively, suggested by the system) as people to whom the photo (and its associated data) should be sent. If email addresses for those two people are known (or are in an accessible address book with emails corresponding to their names) or, if those two people are included in a social networking site or other communications facility that provides communication capabilities between the user and others, then the screen display seen in FIG. 10 could be sent to them, as well as any other person added to the sharing data at data field 1020. As seen in FIG. 10, rights to the shared photo can be designated by the user ("Copy"—the recipient may copy the shared photo, "View"—the recipient may only view the shared photo, and "Tag"—the recipient may add further tagging information to the tagging information seen in the window 512).

Figure 11:
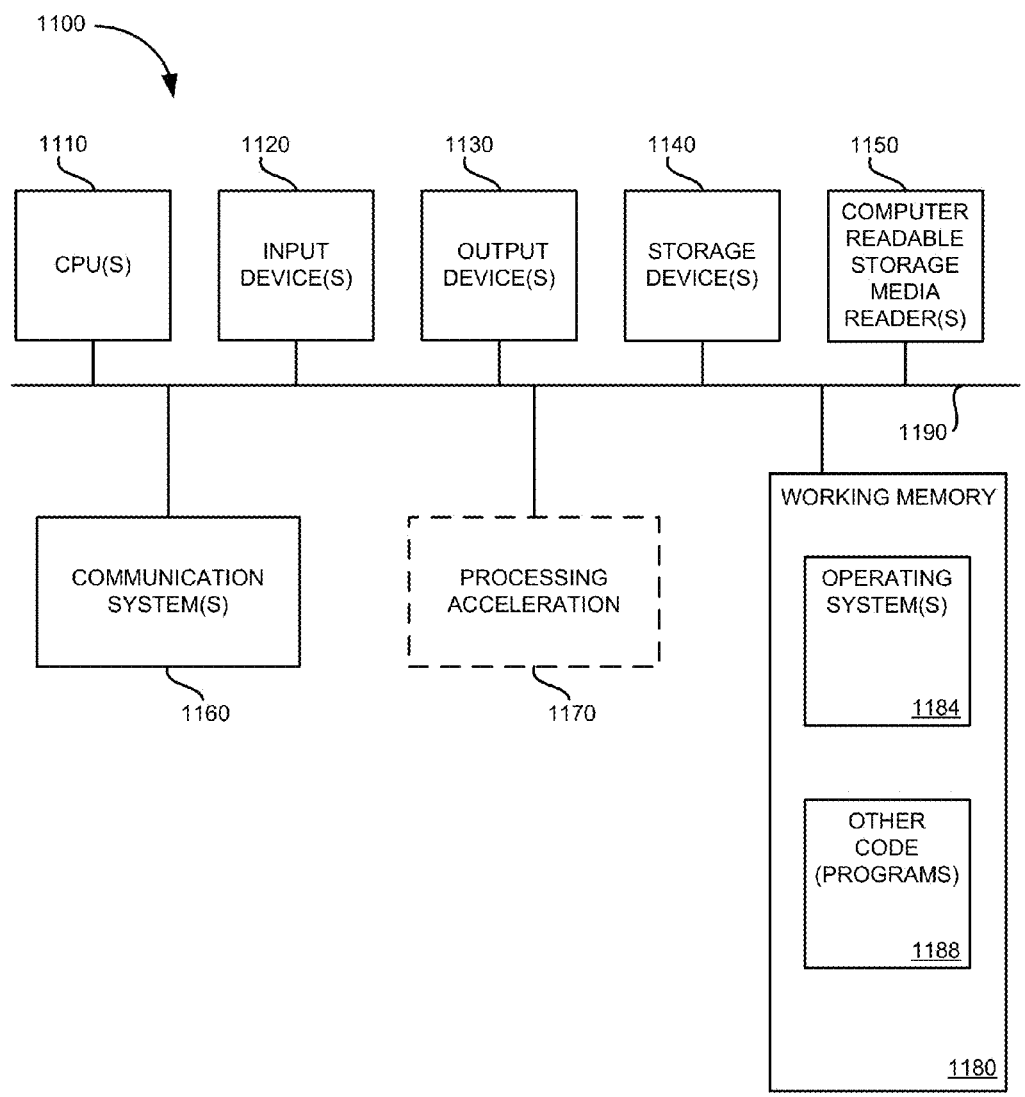
FIG. 11 is a block diagram illustrating an exemplary computer system upon which embodiments of the present invention may be implemented.

FIG. 11 is a block diagram illustrating an exemplary computer system upon which embodiments of the present invention may be implemented. This example illustrates a computer system 1100 such as may be used, in whole, in part, or with various modifications, to provide the functions of the computer systems 102 and 120, as well as other components and functions of the invention described herein.

The computer system 1100 is shown comprising hardware elements that may be electrically coupled via a bus 1190. The hardware elements may include one or more central processing units 1110, one or more input devices 1120 (e.g., a mouse, a keyboard, etc.), and one or more output devices 1130 (e.g., a display device, a printer, etc.). The computer system 1100 may also include one or more storage devices 1140, representing remote, local, fixed, and/or removable storage devices and storage media for temporarily and/or more permanently containing computer-readable information, and one or more storage media reader(s) 1150 for accessing the storage device(s) 1140. By way of example, storage device(s) 1140 may be disk drives, optical storage devices, solid-state storage device such as a random access memory ("RAM") and/or a read-only memory ("ROM"), which can be programmable, flash-updateable or the like.

The computer system 1100 may additionally include a communications system 1160 (e.g., a modem, a network card—wireless or wired, an infra-red communication device, a Bluetooth™ device, a near field communications (NFC) device, a cellular communication device, etc.) The communications system 1160 may permit data to be exchanged with a network, system, computer, mobile device and/or other component as described earlier. The system 1100 also includes working memory 1180, which may include RAM and ROM devices as described above. In some embodiments, the computer system 1100 may also include a processing acceleration unit 1170, which can include a digital signal processor, a special-purpose processor and/or the like.

The computer system 1100 may also comprise software elements, shown as being located within a working memory 1180, including an operating system 1184 and/or other code 1188. Software code 1188 may be used for implementing functions of various elements of the architecture as described herein. For example, software stored on and/or executed by a computer system, such as system 1100, can be used in implementing the processes seen in FIGS. 2 and 6.

It should be appreciated that alternative embodiments of a computer system 1100 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the systems 102 and 120 may each be implemented by a single system having one or more storage devices and processing elements. As another example, the systems 102 and 120 may each be implemented by plural systems, with their respective functions distributed across different systems either in one location or across a plurality of linked locations.

Moreover, while the various flows and processes described herein (e.g., those illustrated in FIGS. 2 and 6) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for associating a photo with a data structure, comprising:
    displaying the photo at a graphical user interface (GUI);
    selecting at least one image in the photo relating to a first subject in the photo;
    in response to selecting the at least one image, creating a first data node that is initially empty;
    displaying the first data node at the same GUI;
    at the GUI, graphically moving the selected image to the displayed first data node; and
    in response to graphically moving the selected image to the displayed first data node, associating the photo with the first data node, so that the first data node is no longer empty;
    entering photo tagging information in order to identify the displayed photo;
    displaying a node identifying window at the GUI in response to associating the photo with the first data node, wherein the node identifying information is entered at the node identifying window, and wherein the node identifying information relates to the first subject in the photo and identifies the displayed first data node;
    after associating the photo with the first data node, creating relationship nodes that are initially empty, each relationship node representing one or more different subjects having a relationship to the first subject;
    displaying the relationship nodes at the GUI, each relationship node connected to the first data node in order to represent the relationship between the first subject and one of the different subjects;
    selecting a second image in the photo relating to the one or more different subjects; and
    at the GUI, graphically moving the selected second image in the photo to one of the displayed relationship nodes, so that the one of the displayed relationship nodes is no longer empty.

2. The method of claim 1, further comprising displaying a photo tagging window at the GUI in response to associating the photo with the data node, wherein the photo tagging information is entered at the displayed photo tagging window, and wherein the photo tagging information identifies the displayed photo.

3. The method of claim 2, wherein the photo tagging information is selected from a group comprising a name, place, event, or thing associated with the photo.

4. The method of claim 1, further comprising:
    displaying a sharing window for entering information identifying a person for receiving the photo and the photo tagging information.

5. The method of claim 1, wherein the first subject is a first person, wherein the different subjects are each a different person having a familial relationship to the first subject.

6. The method of claim 1, wherein the displayed first data node represents a person, and wherein the at least one image is a facial image.

7. The method of claim 1, wherein associating the photo with the data node comprises storing a copy of the photo at the data node.

8. The method of claim 1, wherein associating the photo with the data node comprises associating a link with the data node, the link identifying a location where the photo may be accessed.

9. The method of claim 1, wherein in response to graphically moving the selected second facial image in the photo to the one of the displayed relationship nodes, the photo is associated with the one of the displayed relationship nodes, whereby the tagging information identifying the displayed photo is associated with the photo stored at the data node and with the same photo stored at the one of the displayed relationship nodes.

10. The method of claim 1, wherein the photo has a subject, and wherein the method further comprises:
   determining the first subject of the photo; and
   creating the first data node based on the determined subject.

11. The method of claim 10, wherein the determined subject of the photo is a category chosen from a group comprising: childhood, early school years, high school, college, marriage, career and military.

12. A system for associating a photo with a data structure, comprising one or more processors programmed to:
   display the photo at a graphical user interface (GUI);
   detect at least one image of a subject in the photo;
   select the at least one image in the photo relating to a first subject in the photo;
   in response to selecting the at least one image, create a first data node that is initially empty;
   display the first data node at the same GUI;
   graphically move the selected image at the GUI to the displayed first data node;
   in response to graphically moving the selected image to the displayed first data node, associate the photo with the first data node, so that the first data node is no longer empty;
   receive photo tagging information in order to identify the displayed photo;
   display a node identifying window at the GUI in response to associating the photo with the first data node, wherein node identifying information is entered at the node identifying window, and wherein the node identifying information relates to the first subject in the photo and identifies the displayed first data node;
   after associating the photo with the first data node, create relationship nodes that are initially empty, each relationship node representing one or more different subjects having a relationship to the first subject;
   display the relationship nodes at the GUI, each relationship node connected to the first data node in order to represent the relationship between the first subject and one of the different subjects;
   select a second image in the photo relating to the one or more different subjects; and
   at the GUI, graphically move the selected second image in the photo to one of the displayed relationship nodes, so that one of the displayed relationship nodes is no longer empty.

13. The system of claim 12, wherein the one or more processors are further programmed to:
   display a photo tagging window at the GUI in response to associating the photo with the data node, wherein the photo tagging information is entered at the displayed photo tagging window, and wherein the photo tagging information identifies the displayed photo.

14. The system of claim 13, wherein the photo tagging information is selected from a group comprising a name, place, event, or thing associated with the photo.

15. The system of claim 12, wherein the one or more processors are further programmed to:
   display a sharing window for entering information identifying a person for receiving the photo and the photo tagging information.

16. The system of claim 12, wherein the first subject is a first person, wherein the different subjects are each a different person having a familial relationship to the first subject.

17. The system of claim 12, wherein the displayed first data node represents a person, and wherein the at least one image is a facial image.

* * * * *